United States Patent [19]
Reitmeier et al.

[11] Patent Number: 6,084,912
[45] Date of Patent: Jul. 4, 2000

[54] VERY LOW BIT RATE VIDEO CODING/ DECODING METHOD AND APPARATUS

[75] Inventors: Glenn Reitmeier, Yardley, Pa.; Ya-Qin Zhang, North Cranbury, N.J.

[73] Assignees: Sarnoff Corporation, Osaka, Japan; Sharp Kabushiki Kaisha, Princeton, N.J.

[21] Appl. No.: 08/884,666

[22] Filed: Jun. 27, 1997

Related U.S. Application Data

[60] Provisional application No. 60/020,673, Jun. 28, 1996.

[51] Int. Cl.[7] ................................................ H04N 07/18
[52] U.S. Cl. .................... 375/240; 348/403; 348/404; 348/416; 348/415; 348/699
[58] Field of Search ..................... 348/407, 399, 348/402, 699, 413, 416, 415; 382/276, 107, 268, 209; 375/340

[56] References Cited

U.S. PATENT DOCUMENTS

| | | | |
|---|---|---|---|
| 5,692,063 | 11/1997 | Lee et al. | 382/107 |
| 5,802,220 | 9/1998 | Black et al. | 382/276 |
| 5,886,743 | 3/1999 | Oh et al. | 348/407 |

*Primary Examiner*—Andy Rao
*Attorney, Agent, or Firm*—William J. Burke

[57] ABSTRACT

A method and apparatus for coding motion video (images) that produces very low bit rate video representation and minimizes the amount of data needed to be transferred to the decoder. The apparatus comprises a 2-pass segmentation section, a 2-stage motion estimation/compensation section that optionally employs Affine Motion Compensation (AMC), a wavelet transform section, a Zero-Tree Wavelet Quantization (ZTQ) section, a code book, a comparator, a reconstruction section, a coder, a frame memory and an entropy coder.

20 Claims, 6 Drawing Sheets

VERY LOW BIT RATE VIDEO CODING/DECODING METHOD AND APPARATUS

This application claims the benefit of U.S. Provisional Application Ser. No. 60/020,673 filed Jun. 28, 1996.

The present invention relates to an apparatus and concomitant method for optimizing the coding and decoding of motion video. More particularly, this invention relates to a method and apparatus that applies frame stabilization, 2-pass object-oriented motion compensation (OMC) and background memory for very low bit rate video representation and communications.

BACKGROUND OF THE INVENTION

The increasing development of digital video technology presents an ever increasing problem of reducing the high cost of video compression codecs and resolving the interoperability of equipment of different manufacturers. To achieve these goals, the Moving Picture Experts Group (MPEG) created the ISO/IEC international Standards 11172 (1991) (generally referred to as MPEG-1 format) and 13818 (1995) (generally referred to as MPEG-2 format). One goal of these standards is to establish a standard coding/decoding strategy with sufficient flexibility to accommodate a plurality of different applications and services such as desktop video publishing, video conferencing, digital storage media and television broadcast.

Although the MPEG-1 and 2 standards have proven to be very successful, ISO/SG29/WG11 is focusing on the next-generation of audiovisual multimedia coding standard known as MPEG-4. MPEG-4 intends to provide an audio-visual coding standard that allows for interactivity, high compression, and/or universal accessibility, with high degree of flexibility and extensibility. One goal is to provide a very low bit rate video coding scheme.

Very low bit rate video coding has received considerable attention in academia and industry in terms of both coding algorithms and standards activities. In addition to the earlier ITU-T efforts on H.320 standardization for video conferencing from 64 kbps to 1.544 Mbps in ISDN environment, the ITU-T/SG15 has now formed an expert group on low bit coding (LBC) for visual telephony below 64 kbps. The ITU-T/SG15/LBC development consists of two phases: the near-term and the long-term. The near-term standard H.324, based on existing compression technologies, mainly addresses the issues related to visual telephony at below 28.8 kbps, the V.34 modem rate used in the existing Public Switched Telephone Network (PSTN). H.324 has been adopted as an ITU-T standard. The long-term standard H.324/L, relying on fundamentally new compression technologies with much improved performance, will address video telephony in both PSTN and mobile environment.

Therefore, a need exists in the art for an apparatus and method for coding motion video that will produce very low bit rate video representation and communications, which is appropriate for both MPEG-4 and H.324/L.

SUMMARY OF THE INVENTION

The present invention is a method and apparatus for coding motion video that produces very low bit rate video representation and minimizes the amount of data needed to be transferred to the decoder. The apparatus of the present invention comprises a 2-pass segmentation section, a 2-stage motion estimation/compensation section that optionally employs Affine Motion Compensation (AMC), a wavelet transform section, a Zero-Tree Wavelet Quantization (ZTQ) section, a code book, a comparator, a reconstruction section, a coder, a frame memory and an entropy coder.

The 2-pass segmentation with feedback is implemented to separate the "objects" and "background" from an input image. The feedback after synthesis is used to provide a more accurate segmentation with identification of "segmentation-failure" regions.

The 2-stage motion compensation is used for "object", where the first stage compensates the global object motion with an "Affine Transformation" and the second stage refines the detailed motion using pel-based recursive technique. The Affine Motion Compensation (AMC) increases the effectiveness of the present invention, since global translation, zooming, and lighting changes are considered and compensated. The global AMC (GAMC) not only minimizes the probability for mis-classification, but also significantly reduces the number of "occluded" areas and hence increases the coding efficiency.

Various portions of each image are classified as one of two possible classes, e.g., "objects" and "background". The present bit allocation scheme assigns different bits to different classes. For the background, only the LL band (the root tree) is coded, while, in contrast, the objects are treated with the highest priority.

Finally, the present video encoder incorporates a self-learning process. Namely, the video encoder selectively "memorizes" (stores) previously encoded information and then applies this memory to minimize the transmission of redundant information. This concept of using "background memory" is especially effective for background scene with some camera panning.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
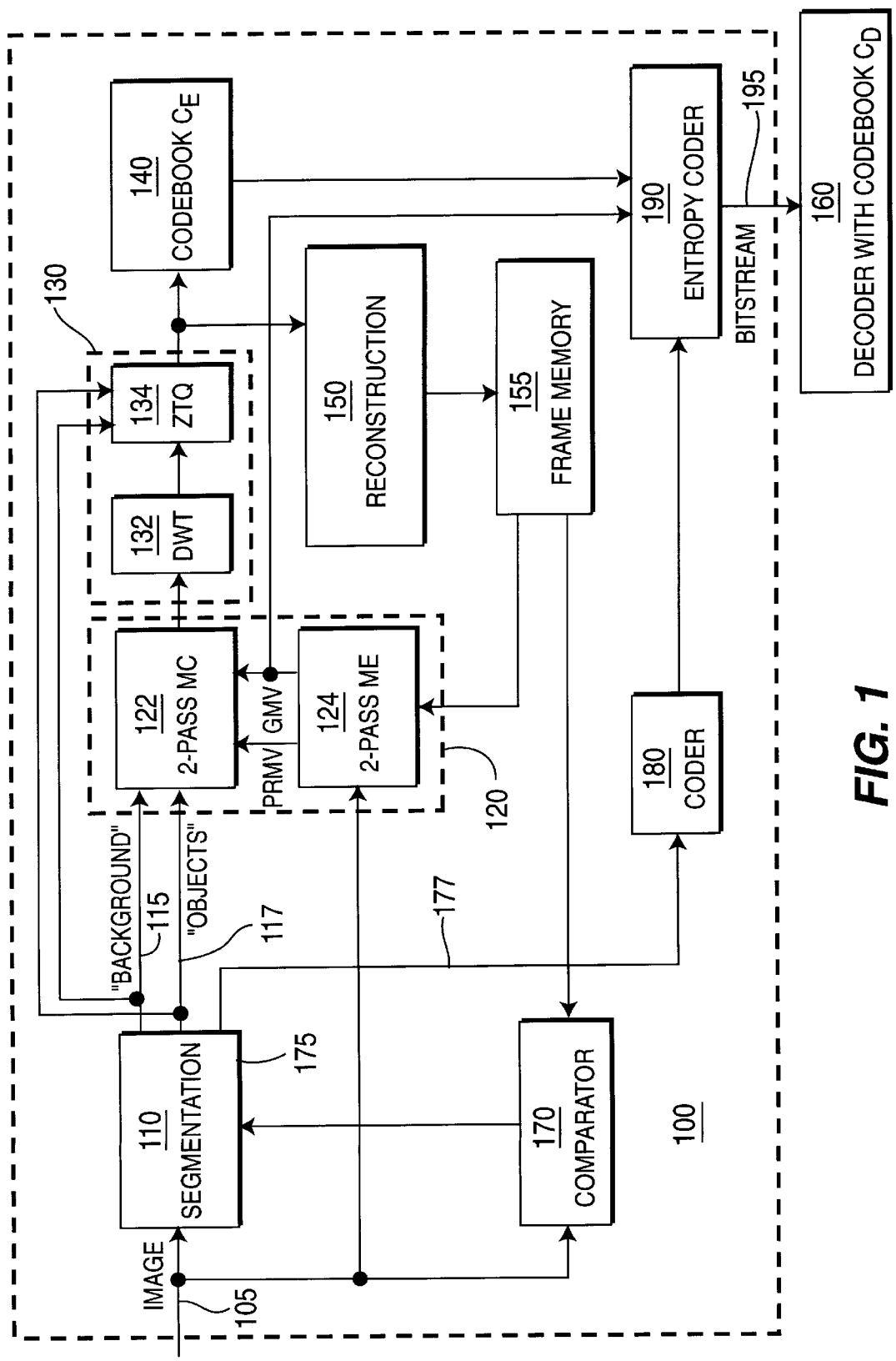
FIG. 1 illustrates a block diagram of the apparatus of the present invention.

FIG. 1 illustrates an apparatus 100 for coding motion video that produces very low bit rate video representation and minimizes the amount of data needed to be transferred to the decoder. In the present invention, apparatus 100 is a video encoder. The video encoder can be a standalone hardware device, or simply a portion of a much larger encoding system, e.g., application specific integrated circuits (ASIC). In fact, the video encoder can be implemented as a software application residing in the memory of a general purpose computer (not shown) or stored within a storage medium, e.g., a disk.

Specifically, an input image (motion video) on path 105 is passed to a segmentation section 110, where a first-pass segmentation is implemented to separate the "objects" or "object regions" (onto path 117) and the "background" or "background regions" (onto path 115) from the input image. Various segmentation methods are known and can be applied to the present invention, such as disclosed by Patrick Campbell McLean, in "Structured Video Coding", master thesis submitted to the Media Arts and Science Section, Massachusetts Institute of Technology, June 1991 or pending U.S. patent application Ser. No. 08/339,491 filed on Nov. 14, 1994, which is incorporated herein by reference.

Alternatively, the segmentation process can be performed in the lowest level of the wavelet-filtered frame to reduce the computational complexity. Namely, the segmentation process can be performed after the input image undergoes wavelet transform as discussed below or the input image may have already undergone wavelet transform.

Next, a two pass motion estimation/compensation is applied to the segmented input image via a 2-pass motion estimation/compensation section 120. More specifically, a global motion estimation (ME) and compensation (MC) sections 122 and 124 are used to initially applied motion estimation and/or compensation to the background and objects. Various global motion estimation methods can be applied to the present invention, such as the global motion estimation method disclosed in the pending U.S. patent application Ser. No. 08/300,023 filed on Sep. 2, 1994, which is incorporated herein by reference.

Using the global motion vectors, a second motion estimation and compensation process is then applied, i.e., a local pel-recursive motion estimation and compensation is performed on the objects. A more detailed illustration of the two-stage motion estimation/compensation is illustrated in FIG. 2.

Finally, FIG. 1 also illustrates the segmented image being forwarded directly to the ZTQ 134. The segmented image on these paths can be used to implement a rate control mechanism. Namely, the bit budget can be allocated based upon the type of the segmented images. For example, in the preferred embodiment, the available bits are allocated such that the bit budget assigned to the objects is approximately four (4) times that of the bit budget assigned for the background. However, different applications or implementations may require a different bit budget allocation scheme.

Figure 2:
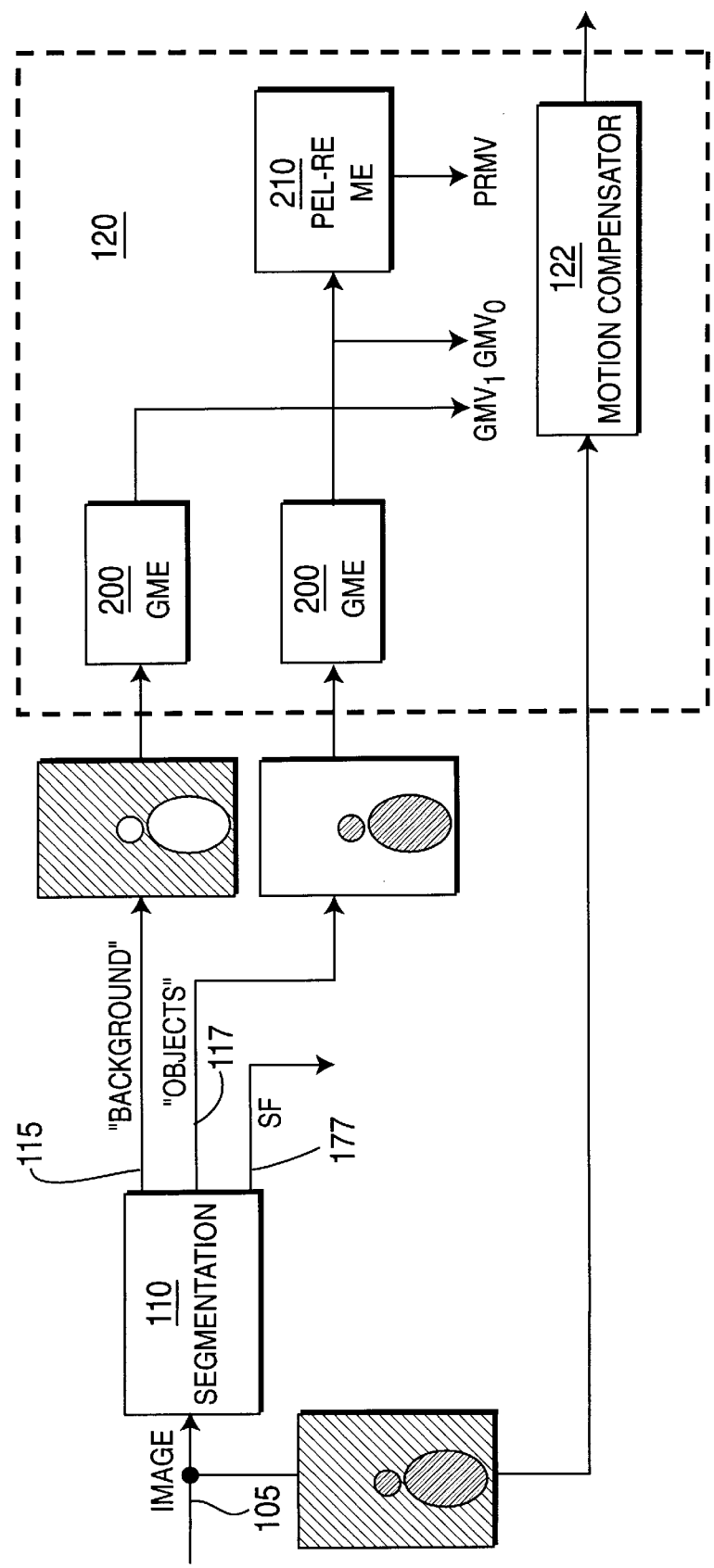
FIG. 2 illustrates a detailed block diagram of a two-stage motion estimation/compensation.

FIG. 2 is a detailed block diagram that illustrates the two-stage motion estimation/compensation section 120. As illustrated, separate background and object signals on paths 115 and 117 respectively are sent to two global motion estimation sections 200 to produce two sets of global motion vectors $GMV_0$ and $GMV_1$.

Furthermore, the global motion vectors for the object regions are forwarded to a pixel-recursive (Pel-Re) based motion estimation section 210, where the global motion vectors are used to refine and generate pixel-recursive motion vectors (PRMV) for the object regions. Finally, all the motion vectors, $GMV_0$, $GMV_1$ and PRMV, are forwarded to the motion compensator 122, where a motion compensated image (or residual frame) is generated.

Although FIG. 2 illustrates multiple ME sections 200, it should be noted that these multiple ME sections can be implemented as a single ME section, e.g., via a multiplexer (not shown). Furthermore, although pixel-recursive (Pel-Re) based motion estimation is only applied to the object regions, it should be noted that pixel-recursive based motion estimation can also be applied to the background regions.

Alternatively, the "Affine" ME and a pattern learning process can be implemented with the present invention. The Affine motion model is disclosed by J. Nieweglowski et al. in "A Novel Video Coding Scheme Based On Temporal Prediction Using Digital Image Warping", IEEE Trans. Consumer Electronics, Vol. 39, 3, pp. 141–150, August, 1993, which is incorporated herein by reference. The Affine motion method constructs a prediction image or frame from a previous image by applying a geometric transformation known as "image warping". The transform specifies a spatial relationship between each point in the previous and prediction images.

Alternatively, the present invention may also incorporate a variable size Affine motion method, which is disclosed in a provisional patent application filed on June 28, 1996 under Attorney Docket 12074P (which was converted into a 111(a) application on Oct. 23, 1996 with serial # 08/735,869) and is herein incorporated by reference.

Next, a spatial coder, e.g., a Zero-Tree Wavelet (ZW) coder 130 (containing a wavelet transform (DWT) 132 and a Zero-Tree Quantization (ZTQ) 134) is applied to the motion-compensated frame or image. For the object regions, all "isolated trees" are coded. For the background, all isolated trees are discarded. Isolated trees represent those nodes, after wavelet transformation, that may or may not be an "Zerotree". The "Zerotree" is unique in that its characteristics are predictable, such that it is possible for an encoder to selectively drop those nodes identified as Zerotrees from the encoding process. Zerotree is defined in the above identified application (serial # 08/735,869).

In contrast, the uncertainty of the characteristics of isolated trees typically requires an encoder to include those nodes identified as isolated trees into the encoding process. Thus, the present invention potentially sacrifices some information in the "background" in exchange for a lower bit rate.

In fact, an alternative embodiment only codes the LL band (the root tree) for the background. Namely, after a wavelet transform is applied to the background regions, only the LL band is actually used and encoded.

Thus, in this implementation, data in the background is selectively dropped (regardless of their "Zerotree classification") in favor of reducing the number of transmitted bits. Clearly, object regions are treated with greater priority than that of the background regions. This tradeoff is typically acceptable due to the attention placed by the viewers on the moving objects versus the background.

Alternatively, the present invention can be implemented using the concept of scalar and vector Zero-Tree encoding, as disclosed in a provisional patent application filed on Jun. 28, 1996 under Attorney Docket 12193P (which was converted into a 111(a) application on Oct. 24, 1996 with serial # 08/736,114), and is herein incorporated by reference.

The signal or a portion thereof (e.g., a slice of blocks) of the transformed signal from the ZTQ is applied to the Codebook $C_E$ 140 to determine whether it should be appended to the Codebook $C_E$. The Codebook 140 stores various signals such as various portions of the background that appear repeatedly in numerous frames. By incorporating a similar Codebook $C_D$ 160 in the decoder as shown in FIG. 1, the bitstream may simply refer to the relevant indices of the Codebooks without having to code the signal itself.

For example, the encoded bitstream may only contain encoded information for the objects, while background information is represented by indices useful in retrieving a previously displayed background from the Codebook $C_D$ 160. The ability to send only a very small amount of information with regard to the background, significantly reduces the amount of data bit that must be transmitted to the decoder 160.

More specifically, the encoder vector codebook $C_E$ and decoder codebook $C_D$ should be initialized with the first frame segmented with proper block size. The first frame is typically intra-frame coded using any existing image coding schemes such as wavelet/subband coders or discrete cosine transform (DCT) coder. In the preferred embodiment, the Codebooks are only used to stored background information, but depending on the specific application, it may also be practical to store frequently repeated object information.

The "background memory" with pattern learning is dynamically updated and synchronized in both the encoder and decoder. A detailed discussion on the use of the Codebooks are disclosed below. The Codebooks can be implemented using a storage device, e.g., a random access memory (RAM) (not shown).

Returning to FIG. 1, an inverse ZW and motion decompensation is performed by a reconstruction section 150 to retrieve the coded frame, and compared with the original frame via a comparator 170. The decomposed frame is stored in the frame memory 155. If the errors E of the relevant regions are larger than a certain value or threshold T, i.e., (E>T), these regions are marked with "segmentation-failure (SF)" pels or regions.

Alternatively, the relevant regions (or objects) that caused the error may undergo a second segmentation via path 175, which may result in an improved motion estimation due to the reduced size. The number of iterations, "N", in performing additional segmentations can be adjusted to a specific application. Generally, only a second segmentation (N=2) is performed due to the computational overhead. In fact, if the encoder detects that the computational overhead is too great, the encoder may forego the necessity of a second segmentation.

All SF regions are encoded independently via path 177 by a coder 180, where all SF regions are excluded from the ZW coder. The coder 177 can be implemented using any conventional spatial coder. However, due to the uncertainty, (e.g., significant error in predicting the motion of the SF regions), the SF regions are intra coded, thereby increasing the amount of transmitted data bits in exchange for accurate reproduction of the SF regions. Finally, an entropy coder 190 is used to code the information from the ZTQ (and/or indices of the Codebook $C_E$,), the global motion vector (GMV) and the information from the coder 180 for the SF regions into a bitstream 195. Namely, global Affine motion vectors, SF regions, and ZW information are entropy-coded to form the bitstream.

Figure 3:
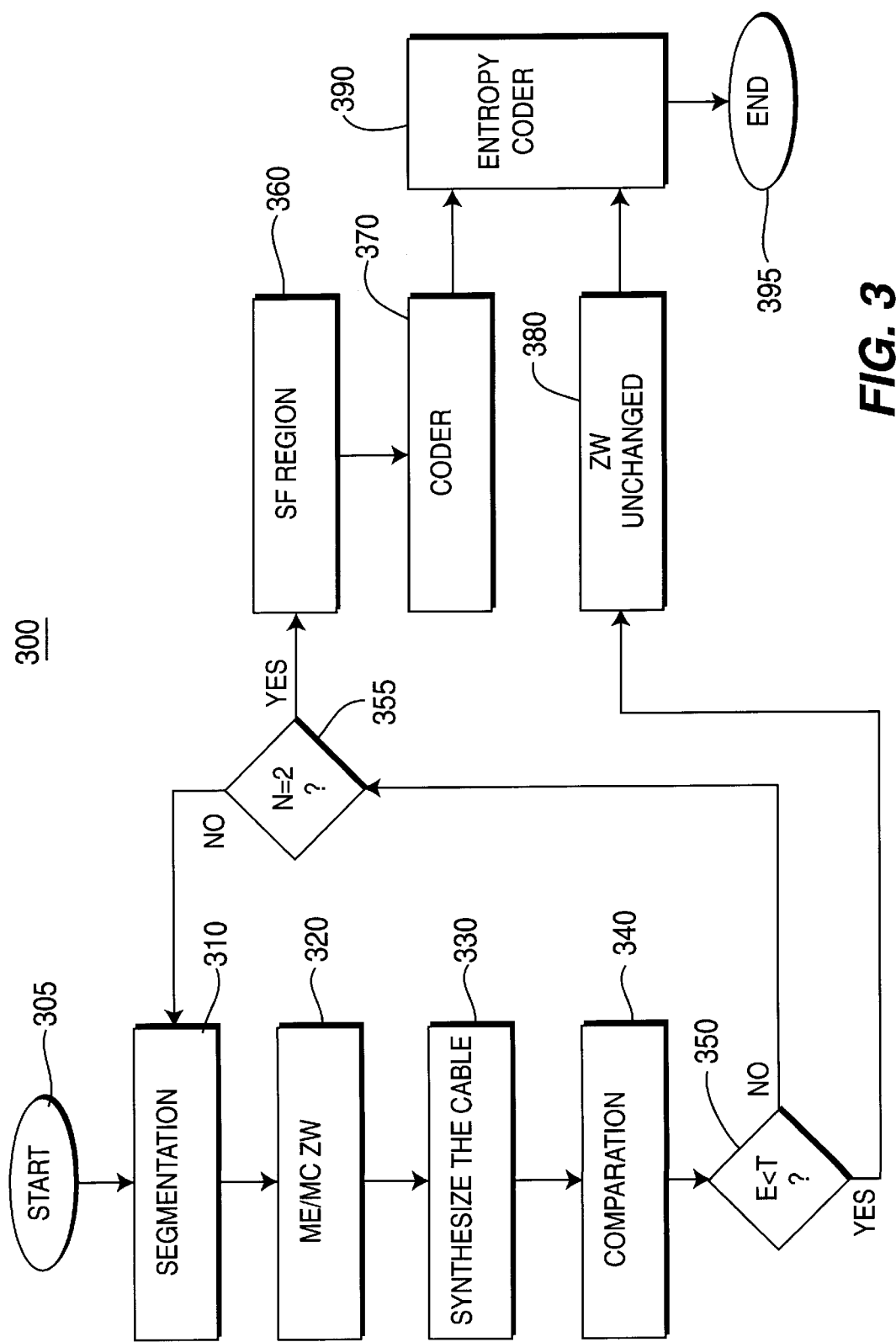
FIG. 3 illustrates a flowchart of a two-pass segmentation method.

FIG. 3 illustrates a flowchart of the 2-pass segmentation method 300. The method 300 starts in step 305 and proceeds to step 310 where a first segmentation is performed.

In step 320, the processes of 2-pass motion estimation/compensation and the various wavelet transform processes are applied to the segmented input image. In step 330, the transformed image is reconstructed and compared in step 340 with the original input image.

In step 350, method 300 queries whether the calculated error, E, is below a predefined acceptable threshold T. If the query is affirmatively answered, method 300 proceeds to step 380, where the wavelet transformed image is unchanged and passed to an entropy coder in step 390 for encoding.

If the query is negatively answered, method 300 proceeds to step 355, where method 300 queries whether a second segmentation has already been applied (N=2?). If the query is affirmatively answered, method 300 proceeds to step 360.

If the query is negatively answered, method 300 returns step 320. The steps of 320–350 are then repeated and if the error is still greater than the threshold, then method 300 proceeds to step 360, where the SF regions are transmitted to a coder. In step 370, the SF regions are intra encoded separately by the coder and then the encoded SF regions are then passed to entropy coder in step 390 to undergo a second encoding process. Method 300 then ends in step 395.

Figure 4:
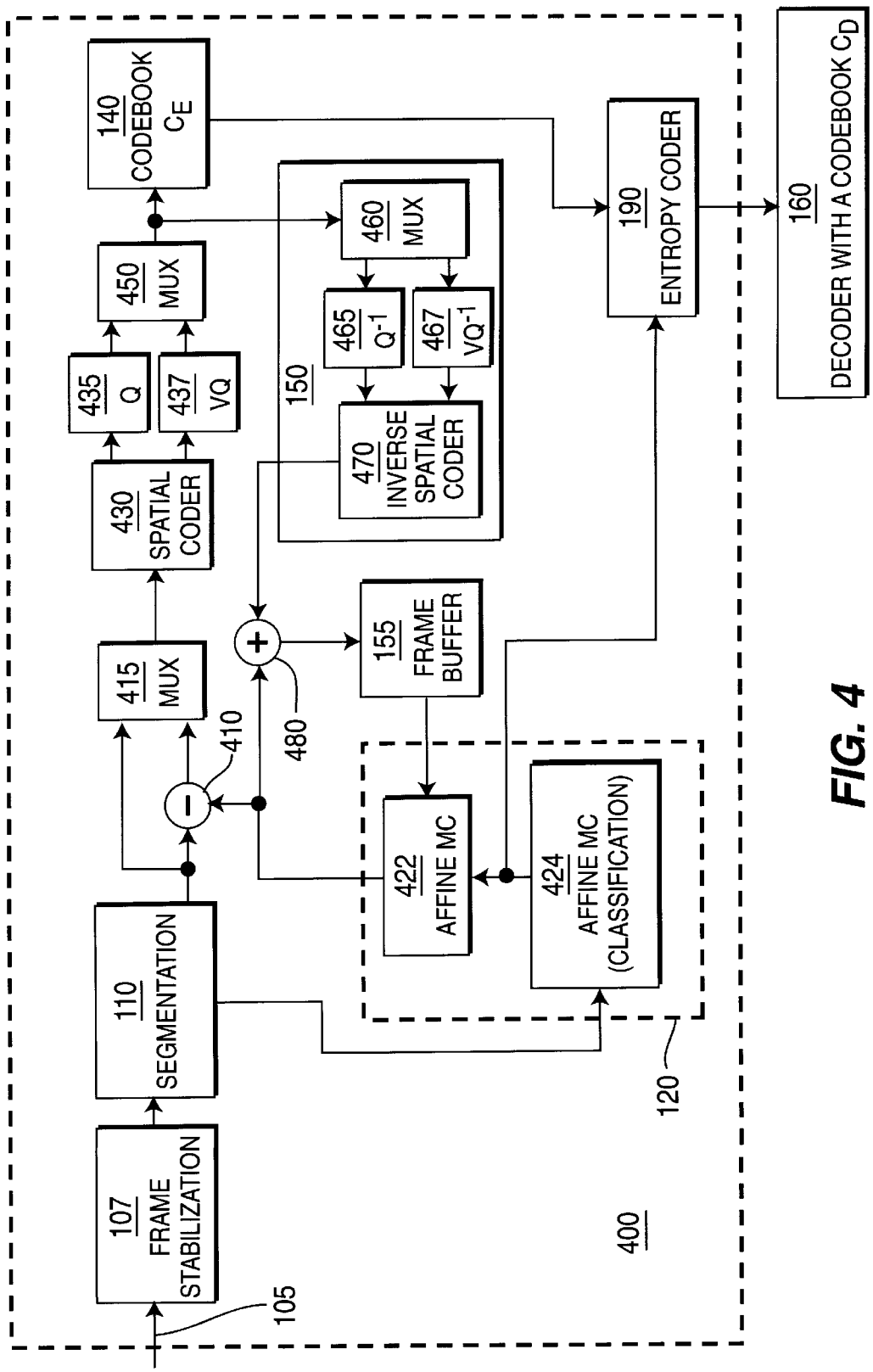
FIG. 4 illustrates an alternate embodiment of the present invention that includes an optional stabilization method and a classification method.

FIG. 4 illustrates an alternate embodiment 400 of the present invention that includes an optional stabilization stage and a classification method. First, a stabilization section 107 applies a stabilization method to the whole video frame to compensate for slight perturbation caused by camera movement. Various stabilization methods exist and a suitable method can be selected for this implementation. The stabilized video frame is then segmented into "background" and "object" regions as described above in segmentation section 110. Although, a two-stage segmentation is not shown, it shown be understood that it can be incorporated into the apparatus of FIG. 4.

Figure 5:
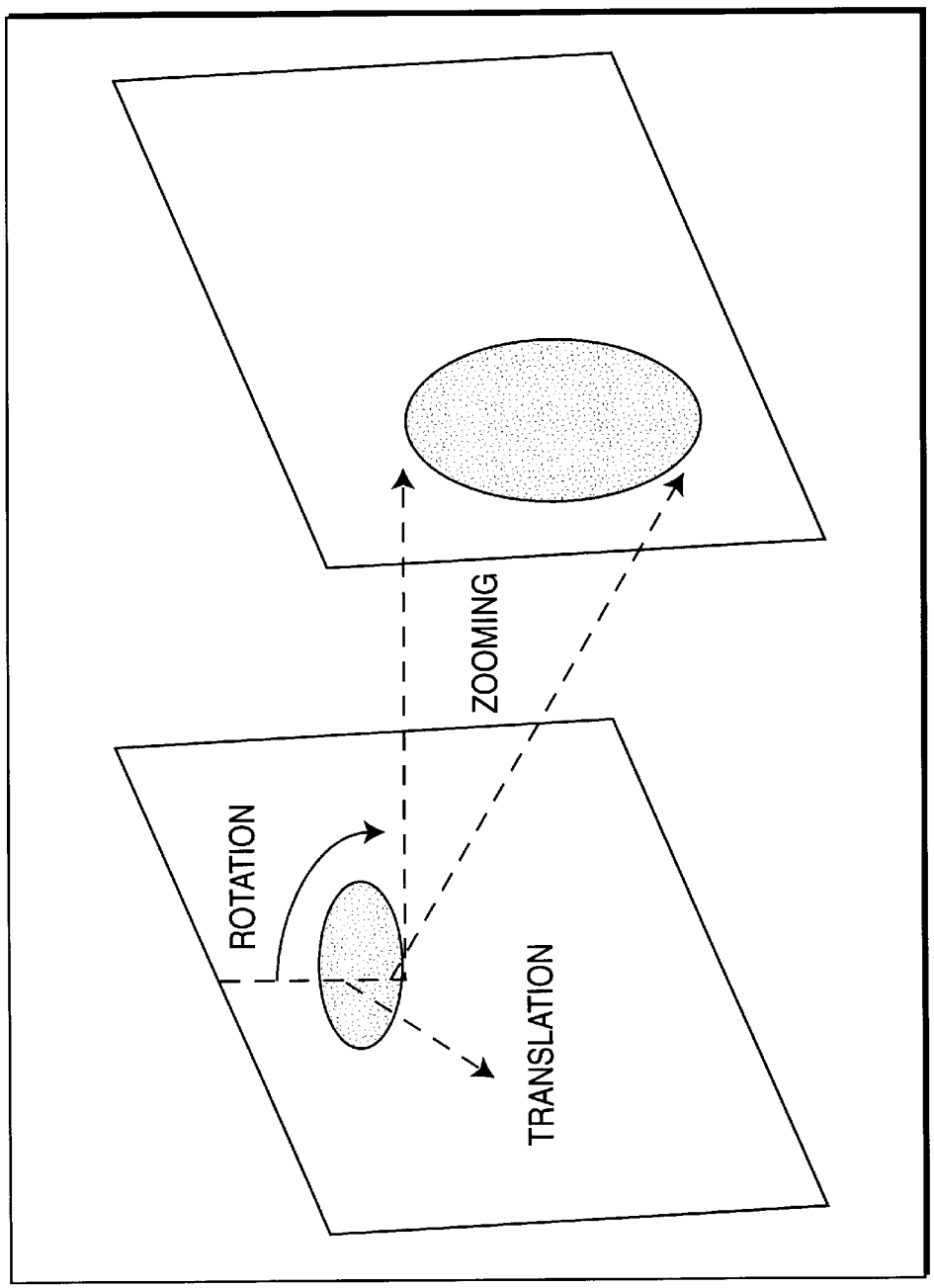
FIG. 5 illustrates the various dimensional changes that are addressed by the Affine Motion Estimation process.

FIG. 4 illustrates an Affine Motion Estimation/Compensation (AMEC) that is performed via an Affine MC section 422 and Affine ME section 424 on the "object" region to compensate for the changes in lighting, rotation, translation, and zooming as shown in FIG. 5. More specifically, let $F_n(x,y,k)$ denote the pixel value at location $(x,y)$ with angle k for frame n. $\Phi_T(a,b,z,\phi)$ is the criterion to be used to measure the distance between two frames after the Affine transform, which is defined as follows:

$$\Phi_T(a, b, z, \phi) = \sum_x \sum_y \sum_b \sum_a N_T\{F_n(x, y, k) - sF_{n-1}(x+a, y+b, k+\phi)\} \quad (1)$$

where s (typically set at the value of 1) is a constant that accounts for lighting and M (i.e., x and y are summed from 0 to M) is the size of a motion macroblock and:

$$N_T(t) = \begin{cases} 0 & t \le T \\ 1 & t > T \end{cases} \quad (2)$$

where $N_T(t)$ is a threshold function. The variables "a" and "b" define a search window W, such that a and b are summed from 0 to W.

The various thresholds discussed in the present invention can be adjusted in response to a particular implementation. However, in the preferred embodiment, the starting threshold is typically set a 0.1 (10%) times a maximum expected value, e.g., 0.1 times the maximum expected value for each pixel, each block, each macroblock, each region or etc.

Figure 6:
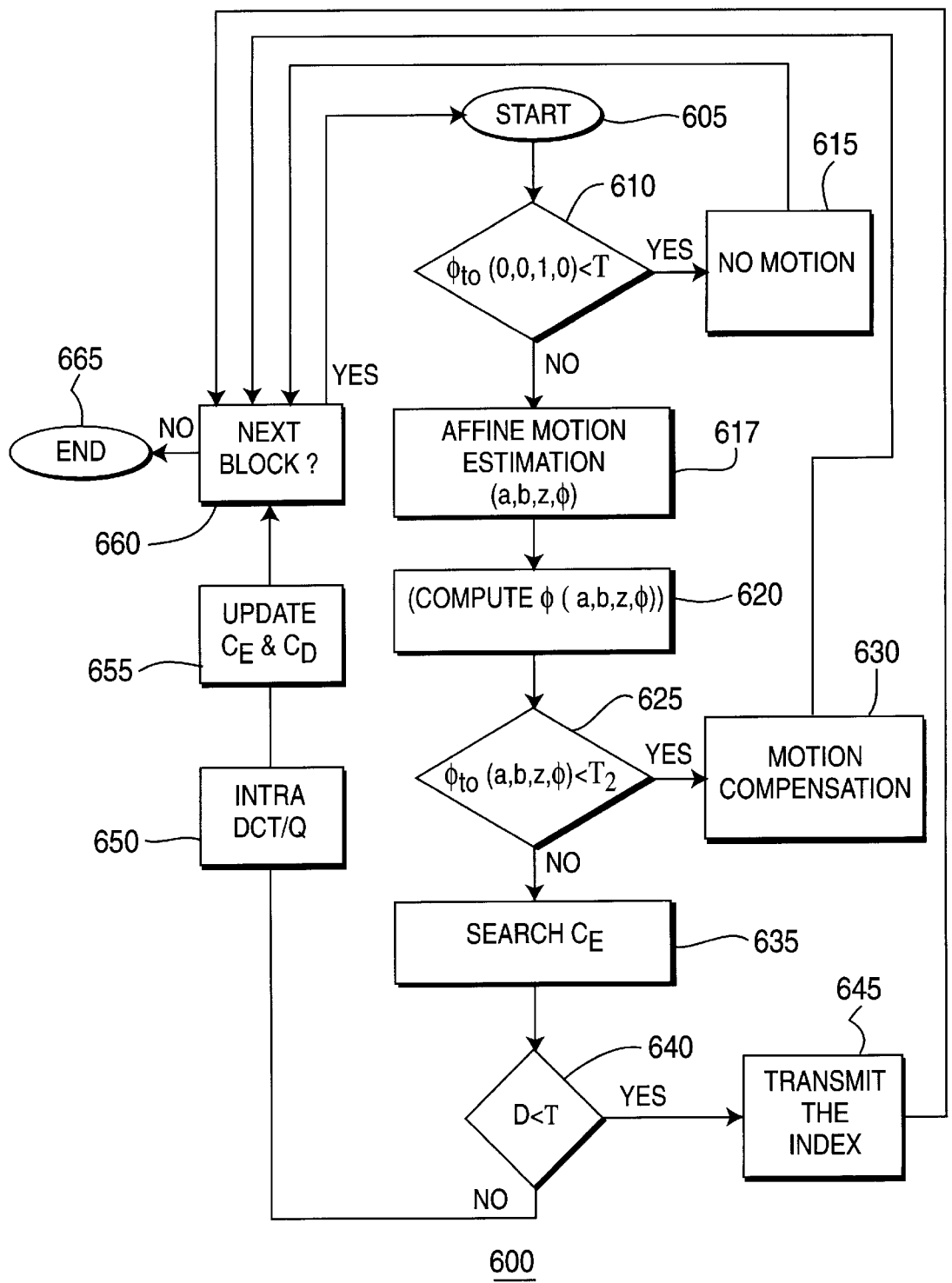
FIG. 6 illustrates a flowchart for the classification process.

According to the energy distribution in the motion-compensated residual frame, a block is classified as "no motion", "motion-compensatable", and "occluded". (Alternatively, the classification can be based solely from information within the ME section, e.g., distance between two motion vectors for the same pixel, block or etc.) Interframe mode is set for "no motion" and "motion-compensatable" regions. All "no motion" and "motion-compensatable" blocks are encoded by an adaptive spatial coder, e.g., DCT coder or DWT coder. A detailed flowchart on the classification method is illustrated in FIG. 6.

Next, a motion-compensated residual frame can be generated via subtractor 410 by comparing the motion compensated image with the original input image. The motion-compensated residual frame is then passed to a multiplexer 415, which serves to forward either the motion-compensated residual frame or the original input image to a spatial coder 430. The spatial coder may employ one or more of the above methods, e.g., DCT transform, wavelet transform, zerotree encoding or etc.

In turn, the encoded or transformed image undergoes either scalar quantization (Q) 435 or vector quantization (VQ) 437. The methods of scalar and vector quantizations are described in the above cited patent applications.

Next, the quantized image is then forwarded via multiplexer 450 to the Code book $C_E$ 140, where an analysis is performed to determine whether the current quantized image contains information that is useful in updating the Code book $C_E$. Any updating of the Code book $C_E$ must correspond with an update of the Code book $C_D$, such that consistency of the stored information in the both Codebooks is maintained.

Additionally, the quantized image is also forwarded to a reconstruction section 150, which is illustrated with a demultiplexer 460, an inverse scalar quantization ($Q^{-1}$) 465, an inverse vector quantization ($VQ^{-1}$) 467 and an inverse transform 470. The reconstruction section 150 serves to reproduce the encoded input image or the residual frame. Finally, a summer 480 is provided to allow a reference frame to be updated in the frame memory 155. Although FIG. 4 illustrates various multiplexers and demultiplexers, it should be understood that the present invention can be modified, so that they can be omitted for a specific implementation.

FIG. 6 illustrates a flowchart of the present classification method 600. Method 600 starts in step 605 and proceeds to step 610 where method queries whether $\Phi_T(0,0,1,0)$ for the current M-sized "motion macroblock" (or simply "motion block") is within a threshold that is defined for "No Motion". For example, method 600 can simply compare the motion vectors for the selected pixel or motion block to determine whether there is a significant difference. If the query is affirmatively answered then method 600 proceeds to step 615, where the current motion block is classified as "No Motion" and method 600 proceeds to step 660. If the query is negatively answered then method 600 proceeds to steps 617 and 620, where Affine motion estimation is performed and $\Phi_T(a,b,z,\phi)$ is computed for the current motion block respectively.

In step 625, method 600 queries whether the computed $\Phi_T(a,b,z,\phi)$ for the current motion block is within a threshold that is defined for "Motion Compensatable". If the query is affirmatively answered then method 600 proceeds to step 630, where the current motion block is classified as "Motion Compensatable" and method 600 proceeds to step 660. If the query is negatively answered then method 600 proceeds to step 635 and the block is classified as "Occluded".

In step 635, method 600 searches in the codebook $C_E$ to find the closest match indicated by a distance D and a threshold T. Method 600 then queries in step 640 whether a match is available such that D<T. If the query is affirmatively answered then method 600 proceeds to step 645, where the corresponding index of the $C_E$ is sent to the decoder instead of the actual encoded background data, and method 600 proceeds to step 660. If the query is negatively answered then method 600 proceeds to step 650 where the motion block undergoes various transformation (encoding) steps as discussed above.

In step 655, method 600 updates $C_E$ by adding the motion block to the codebook $C_E$, and updates $C_D$ by forwarding the necessary information to the decoder, e.g., transmitting the encoded background signal itself along with the indices indicating the location of this background signal as stored in the codebooks. This process allows the coder to "memorize" the previously-occurred patterns such as background, and only needs to transmit the index of the patterns where they are "repainted" back from the corresponding entry in the decoder.

Since and $C_E$ and $C_D$ are limited in sizes, an importance factor (IF) is introduced to indicate the level of importance of a particular entry in the codebook. When the codebook is full, it eliminates the entry with the least IF value. IF value is determined jointly by the frequency and age of the entry. Namely, frequent occurrences of an entry translate into a high IF value. Similarly, recent occurrences in time of an entry also translate into a high IF value. The IF value is updated in both the $C_E$ and $C_D$ codebooks.

To prevent the loss of synchronization in updating $C_E$ and $C_D$, a fall-back codebook (not shown) to both encoder and decoder is used if loss of synchronization is detected. This codebook can be designed with the LBG and other existing training methods.

All the vector indexes, motion vectors, quantized DCT coefficients are entropy-coded. Quantized DCT coefficients can be coded in terms of JPEG-style with Zig-zag scanning and adaptive quantization before entropy coding.

The present method provides a number of advantages. First, the present invention takes advantage of the fact that a typical videophone sequence consists of a stationary background and moving head. This type of simple image enables a relatively accurate segmentation and classification.

Second, the 2-pass global motion estimation and compensation (ME/C) is useful to rectify small motions caused by camera jitter, and is effective for compensating global motion activities caused by head movement. Again this is possible since a background-objects segmentation has been performed.

Third, the 2-pass global ME/C enables a smoother motion field within the object(s), and compensates for the inhomogenous motion activities in the objects-background boundaries.

Fourth, a local pel-recursive ME/C avoids the "blocking effect" and "high-frequency effect" caused by block-matching combined with global wavelet transform.

Fifth, the 2-pass segmentation with feedback and synthesis allows "occluded areas" be detected and treated differently.

Finally, because of the segmentation and 2-pass global ME/C, Zero-tree coder can be more efficiently and effectively applied. The tree structure, bit allocation, and decision threshold can be adapted to the different regions of the sequence.

There has thus been shown and described a novel apparatus and method for coding motion video that will produce very low bit rate video representation and communications. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. A method of encoding an input image to produce a very low bit rate bitstream, said method comprising the steps of:
   (a) segmenting the input image into a background and at least one object;

(b) applying motion estimation (ME) and compensation (MC) to said segmented image to produce a compensated image;

(c) applying a transform to said compensated image to produce a transformed image;

(d) selectively updating a codebook by storing said transformed image or a portion of said transformed image into said codebook; and (e) selectively encoding said transformed image or a portion of said transformed image into the bitstream.

2. The method of claim 1, wherein said segmenting step (a) comprises a first segmentation step and a second segmentation step.

3. The method of claim 2, wherein said second segmentation step is applied to a "segmentation-failure" region.

4. The method of claim 1, wherein said applying ME/MC step (b) comprises a first ME step and a second ME step.

5. The method of claim 4, wherein said second ME step is applied to said object.

6. The method of claim 4, wherein said applying ME/MC step (b) uses an affine motion ME/MC method.

7. The method of claim 6, wherein said affine motion ME/MC method classifies a motion block as "No Motion", "Motion Compensatable" or "Occluded".

8. The method of claim 1, wherein said selectively storing step (d) stores said transformed image of said background.

9. The method of claim 1, wherein said transform applying step (c) applies a wavelet transform and wherein said selectively encoding step (e) encodes only a LL band of said transformed image of said background.

10. A method of encoding an input image to produce a very low bit rate bitstream, said method comprising the steps of:

(a) selectively updating a codebook by storing a transformed image or a portion of said transformed image of the input image into said codebook;

(b) using index to represent a location of said stored transformed image or a portion of said stored transformed image within said codebook; and (c) selectively encoding a portion of said transformed image and said index into a bitstream.

11. The method of claim 10, wherein said stored transformed image is a background of the input image.

12. The method of claim 11, wherein said encoding step (c) encodes a transformed image of an object of the input image and said index.

13. An apparatus for encoding an input image to produce a very low bit rate bitstream comprising:

a segmentation section for segmenting the input image into a background and at least one object;

a motion estimation (ME) and compensation (MC) section, coupled to said segmentation section, for applying motion estimation and compensation to said segmented image to produce a compensated image;

a spatial coder, coupled to said (ME) and (MC) section, for applying a transform to said compensated image to produce a transformed image;

a storage, coupled to said spatial coder, for selectively updating a codebook by storing said transformed image or a portion of said transformed image into said codebook; and a coder, coupled to said storage, for encoding selectively said transformed image or a portion of said transformed image into the bitstream.

14. The apparatus of claim 13, wherein said segmentation section employs a first segmentation step and a second segmentation step.

15. The apparatus of claim 14, wherein said second segmentation step is applied to a "segmentation-failure" region.

16. The apparatus of claim 13, wherein said applying ME/MC section employs a first ME step and a second ME step.

17. The apparatus of claim 16, wherein said second ME step is applied to said object.

18. The apparatus of claim 16, wherein said ME/MC section employs an affine motion ME/MC method.

19. The apparatus of claim 18, wherein said affine motion ME/MC method classifies a motion block as "No Motion", "Motion Compensatable" or "Occluded".

20. The apparatus of claim 13, wherein said storage stores said transformed image of said background.

* * * * *